(12) United States Patent
Kobayashi et al.

(10) Patent No.: US 7,774,099 B2
(45) Date of Patent: Aug. 10, 2010

(54) PROGRAMMING DEVICE FOR RETURNING ROBOT TO WAITING POSITION

(75) Inventors: Hirohiko Kobayashi, Fujiyoshida (JP); Yoshiharu Nagatsuka, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 1348 days.

(21) Appl. No.: 11/165,349

(22) Filed: Jun. 24, 2005

(65) Prior Publication Data
US 2006/0009878 A1 Jan. 12, 2006

(30) Foreign Application Priority Data
Jun. 29, 2004 (JP) ............................. 2004-191796

(51) Int. Cl.
G06F 19/001 (2006.01)
B25J 9/16 (2006.01)
G05B 19/39 (2006.01)

(52) U.S. Cl. ...................... 700/245; 318/568; 318/560; 318/568.11; 318/573; 364/191; 364/192; 364/167.01

(58) Field of Classification Search ................ 700/345; 318/560, 573, 568.1, 568.11; 364/191, 192, 364/167.01
See application file for complete search history.

(56) References Cited

U.S. PATENT DOCUMENTS

| | | | | |
|---|---|---|---|---|
| 4,398,863 A | * | 8/1983 | Shum | 414/733 |
| 4,912,383 A | * | 3/1990 | Takeyama et al. | 318/568.11 |
| 5,075,533 A | * | 12/1991 | Fukuoka et al. | 219/125.11 |
| 5,670,857 A | * | 9/1997 | Choi | 318/573 |
| 5,760,560 A | * | 6/1998 | Ohya et al. | 318/568.1 |
| 6,337,456 B1 | * | 1/2002 | Taniguchi et al. | 219/86.25 |
| 6,429,617 B1 | * | 8/2002 | Sano et al. | 318/560 |
| 2004/0199288 A1 | * | 10/2004 | Watanabe et al. | 700/245 |
| 2005/0049749 A1 | * | 3/2005 | Watanabe et al. | 700/245 |

FOREIGN PATENT DOCUMENTS

| | | |
|---|---|---|
| EP | 0 373 222 | 6/1990 |
| EP | 0 775 557 | 5/1997 |
| EP | 1 256 860 | 11/2002 |
| JP | 61-131001 | 6/1986 |

* cited by examiner

Primary Examiner—Khoi Tran
Assistant Examiner—Ian Jen
(74) Attorney, Agent, or Firm—Drinker Biddle & Reath LLP

(57) ABSTRACT

A programming device for making a program for returning a robot to its waiting position when the robot is stopped by an error. A robot control device is connected to the programming device via a network line. When the robot during operation is stopped by the error, information including data of a position where the robot is stopped is transferred to the programming device. The programming device makes the returning program, based on layout data, the received information and data including teaching positions and attribute data of the positions, by which the robot may be returned from the stop position to the waiting position without interfering with peripheral devices. The returning program is executed by using an offline simulation function of the programming device. The program is transferred to the robot control device after it is judged that interference will not occur. The robot may be safely returned to the waiting position by executing the returning program.

9 Claims, 7 Drawing Sheets

Fig.2

| TEACHING POINT | f | g | h |
|---|---|---|---|
| P1 | 1 | 1 | 0 |
| P2 | 1 | 0 | 0 |
| P3 | 0 | 0 | 1 |
| P4 | 1 | 0 | 0 |
| P5 | 0 | 0 | 1 |
| P6 | 1 | 0 | 0 |
| P7 | 0 | 0 | 1 |
| P8 | 1 | 0 | 0 |
| P9 | 0 | 0 | 1 |
| P10 | 1 | 0 | 0 |
| P11 | 0 | 0 | 1 |
| P12 | 1 | 0 | 0 |
| P13 | 1 | 1 | 0 |

Fig.3

| TEACHING POINT | f | g | h |
|---|---|---|---|
| Q1 | 1 | 1 | 0 |
| Q2 | 1 | 0 | 0 |
| Q3 | 1 | 0 | 0 |
| Q4 | 1 | 0 | 0 |
| Q5 | 1 | 0 | 0 |
| Q6 | 0 | 0 | 1 |
| Q7 | 1 | 0 | 1 |
| Q8 | 1 | 0 | 1 |
| Q9 | 1 | 0 | 1 |
| Q10 | 1 | 0 | 1 |
| Q11 | 1 | 0 | 1 |
| Q12 | 1 | 0 | 1 |
| Q13 | 1 | 1 | 1 |

…

PROGRAMMING DEVICE FOR RETURNING ROBOT TO WAITING POSITION

BACKGROUND OF THE INVENTION

1. Field of the Invention

The present invention relates to a technique for returning a robot, to a waiting position thereof, when the robot during operation is stopped by an accidental factor. More specifically, the present invention relates to a programming device for making a program to return the robot to the waiting position.

2. Description of the Related Art

Generally, the motion of a robot during operation may be stopped by an error or an interference. When stoppage of the robot due to such an accidental factor (hereinafter also called "an emergency stop") occurs, it is usually necessary for the robot to be returned to a waiting position thereof and the whole operation of a robot system is repeated from the beginning. As a concrete way for returning the robot to the waiting position, a manual operation or a jog-feed operation is generally used for moving the robot.

In other words, in fact, a skilled operator cancels the emergency stop for restarting the robot system and moves the robot to the waiting position by a jog-feed. Therefore, it takes a lot of time to restart the system and carry out the operation again. In particular, when a plurality of robots is arranged in a work cell, all of the robots are stopped if the system has a trouble. In this case, the workload of the operator is very large as each of the robots must be sequentially moved by the jog-feed. In spite of such a situation, a concrete proposal of a technique for solving the problem is not found in published documents.

SUMMARY OF THE INVENTION

Accordingly, in order to resolve the above problems, an object of the present invention is to provide a programming device, for making a program for returning a robot to a waiting position (hereinafter also called "a returning program"), by which the robot may be returned to the waiting position when the robot, during operation, is stopped by an accidental factor, without requiring the skill for an operator and a waste of time.

In the present invention, an offline programming device is used as the programming device for making the returning program. The programming device is connected to a communication means (for example, a communication network). When a robot is stopped by an error or the like, predetermined information concerning the stoppage of the robot is sent to the programming device. Then the programming device makes a program for safely returning the robot to a waiting position and executes a simulation on an offline system. When it is confirmed that the robot may be safely returned by the simulation, the program may be downloaded to the robot and executed. In this way, an operator, even if not skilled, may safely return the robot to the waiting position in a short time.

Concretely, according to the present invention, there is provided a programming device connected to a robot operated based on a teaching program, for making a returning program for returning the robot from a stop position where the robot during operation is stopped at a waiting position, the programming device comprising: an attribute data providing part for providing attribute data to each teaching position included in the teaching program, the attribute data representing whether each teaching position may be used for a teaching point of the returning program or not; a storing part for storing at least one teaching program capable of being executed by the robot and layout-information of the robot and an object existing around the robot; a receiving part for receiving data of the stop position, information for discriminating a teaching program stopped by the emergency stop and information of a block of the program executed when the program is stopped by an emergency stop; a selecting part reading a teaching program from the storing part corresponding to the information for discriminating, sequentially searching the teaching positions, from the block of the of the teaching program, in an executing direction of the program or a backward direction thereof, and selecting the teaching points used for the returning program based on the attribute data of the teaching positions; a programming part for making the returning program based on the stop position and the teaching points selected by the selecting part; an interference judging part simulating the operation of the robot based on the returning program prepared by the programming part and the layout-information so as to judge whether interference occurs between the robot and the object around the robot or not; and a transferring part for transferring the returning program to the robot when the interference judging part judges that interference between the robot and the object around the robot does not occur.

The waiting position may be one of a first teaching position and a last teaching position of the teaching program stopped by the emergency stop. Alternatively, the waiting position may be determined as one of the teaching positions included in the teaching program stopped by the emergency stop, based on the attribute data provided to each teaching position. Otherwise, the waiting position may be determined as another position except for the teaching positions included in the teaching program stopped by the emergency stop.

The storing part may store a cycle time of the teaching program, and the selecting part may select the teaching positions by sequentially searching the teaching positions in a backward direction of the executing direction of the program when an elapsed time, from the start of the program to the emergency stop, is shorter than a half of the cycle time, or, selects the teaching positions by sequentially searching the teaching positions in the executing direction of the program when the elapsed time is equal to or longer than the half of the cycle time.

Concretely, the selecting part may select the teaching positions by sequentially searching the teaching positions in a backward direction of the executing direction of the program when the block of the program received by the receiving part at the time of the emergency stop is before an intermediate block where a half of the cycle time elapses, or, selects the teaching positions by sequentially searching the teaching positions in the executing direction of the program when the block of the program received by the receiving part is after the intermediate block.

Alternatively, the programming part may compare a program, made by searching the teaching positions in the executing direction of the teaching program, to a program, made by searching the teaching positions in the backward direction of the executing direction of the teaching program, and selects one of the programs, as the returning program, which has shorter time for returning the robot to the waiting position.

When the robot is a welding robot provided with a welding gun, it is preferable that the attribute data include first discrimination data representing whether each teaching position is a welding position where welding is carried out or not, and the selecting part selects the teaching positions other than the welding position, as the teaching points of the returning program.

In this case, the programming part may make the returning program including a command for opening the welding gun before returning the robot to the waiting position, when the welding gun is closed at the stop position where the robot is stopped.

When the robot is a handling robot provided with a hand, it is preferable that the attribute data include second discrimination data representing whether the robot grips an object at each teaching position or not, the robot has a detecting device for detecting whether the robot in fact grips the object in real-time, and the selecting part selects the teaching position, where the robot grips the object based on the second discrimination data, as the teaching points of the returning program, when the robot in fact grips the object at the stop position where the robot is stopped.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 2 is an example of attribute data (codes) added to each teaching point stored in a memory of a programming device in case that a robot program for a spot welding includes thirteen teaching points;

FIG. 3 is an example of attribute data (codes) added in similar way as in FIG. 2, in case that a robot program for a handling using a hand includes thirteen teaching points;

DETAILED DESCRIPTION

Figure 7:
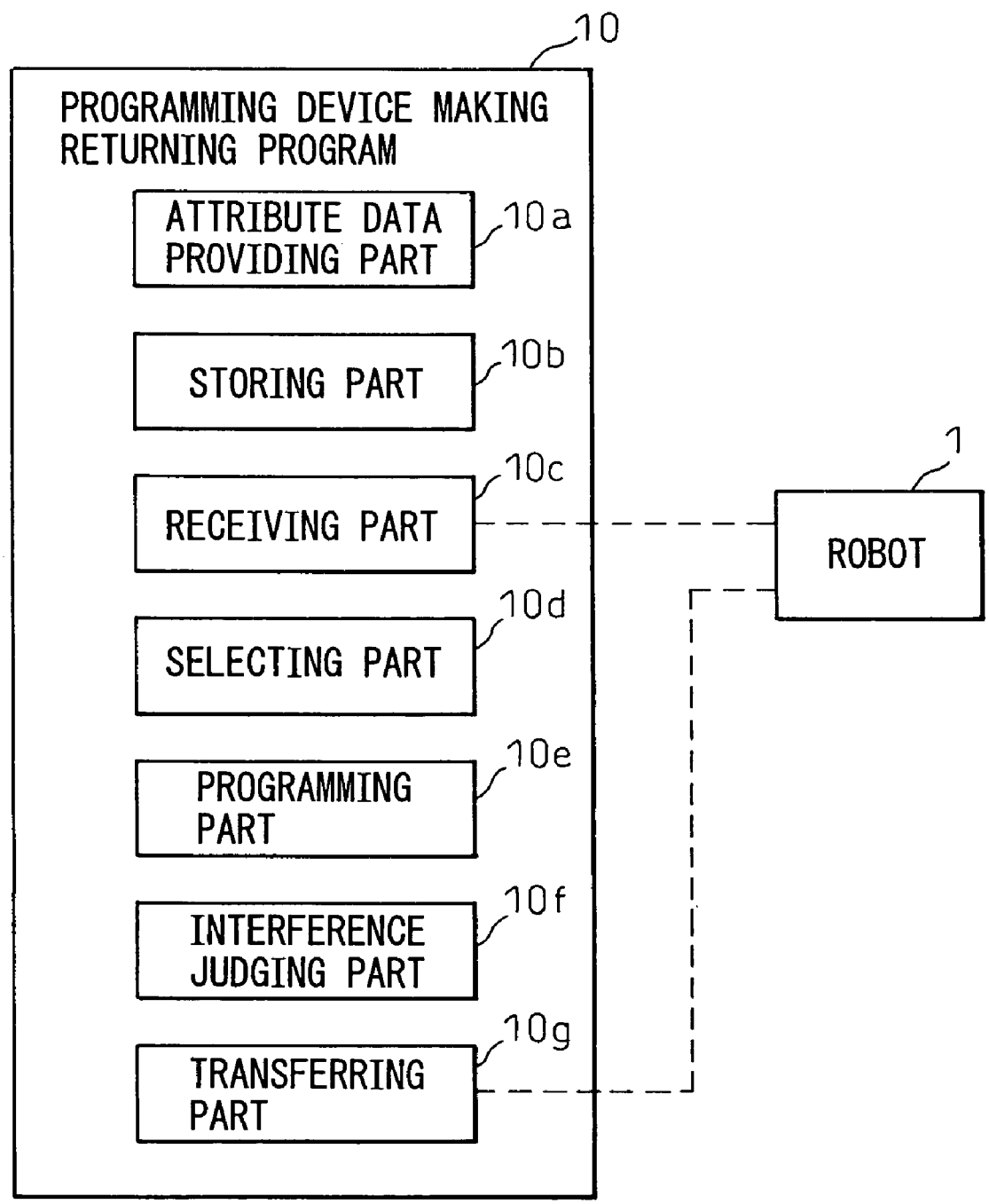
FIG. 7 is a block diagram showing a schematic constitution of a programming device according to the invention, for returning the robot to the waiting position.

FIG. 7 shows a schematic configuration of a programming device 10 according to the present invention, for returning a robot 1 to a waiting position. The programming device 10 includes: an attribute data providing part 10a for providing attribute data to each teaching position included in the teaching program, the attribute data representing whether each teaching position may be used for a teaching point of the returning program or not; a storing part 10b for storing at least one teaching program capable of being executed by the robot 1 and layout-information of the robot 1 and an object existing around the robot 1; a receiving part 10c for receiving data of the stop position, information for discriminating a teaching program stopped by the emergency stop and information of a block of the program executed when the program is stopped by the emergency stop; a selecting part 10d reading a teaching program from the storing part 10b corresponding to the information for discriminating, sequentially searching the teaching positions, from the block of the of the teaching program, in an executing direction of the program or a backward direction thereof, and selecting the teaching points used for the returning program based on the attribute data of the teaching positions; a programming part 10e for making the returning program based on the stop position and the teaching points selected by the selecting part; an interference judging part 10f simulating the operation of the robot 1 based on the returning program prepared by the programming part and the layout-information so as to judge whether interference occurs between the robot 1 and the object around the robot or not; and a transferring part 10g for transferring the returning program to the robot 1 when the interference judging part 10f judges that interference between the robot 1 and the object around the robot 1 does not occur. In an embodiment described below, the above components 10a-10g of the programming device are included in a programming device such as a personal computer 10.

Figure 1:
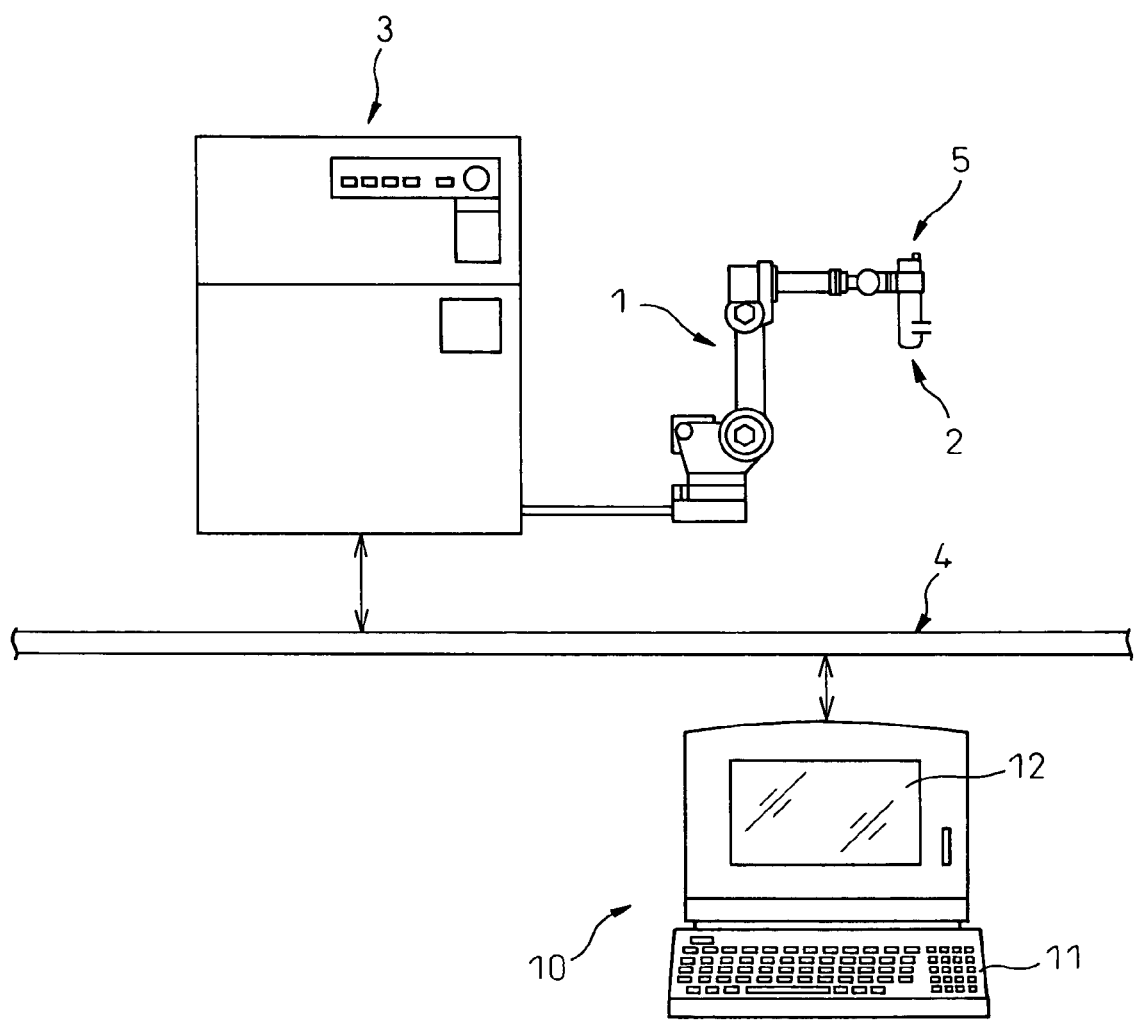
FIG. 1 is a schematic diagram showing a total configuration of one embodiment of the invention.

FIG. 1 shows a total configuration of one embodiment according to the invention. As shown, a numeral 1 denotes a robot (or a mechanism) having a work tool 2 attached to one end of an arm of the robot. The robot 1 is connected to a robot control device 3. Although the work tool 2 may be any kind of tool, the working tool 2 is considered to be a spot welding gun in this case. The robot control device 3 may be a normal type including a CPU, a memory, a servo controller, a communication interface for a network line, an input/output device for an external signal (an I/O board) and an interface for a teaching operation panel, etc., and, controls the robot 1 and the work tool 2 based on a teaching program for the robot. The teaching operation panel and other devices required for the motion of the work tool 2 (for example, a power supply for the spot welding gun) are not shown.

A numeral 4 denotes a communication network line to which the control device 3 and the programming device 10 are connected. A personal computer may be used as the programming device. The personal computer may be a conventional offline programming/simulating device except that the computer has software for processing such as preparing a retuning program described below. The programming device 10 has a CPU, a memory, an interface for the network line and an input/output device for an external signal (an I/O board). Further, the programming device 10 has a keyboard 11 and a display 12 (for example, a LCD).

The programming device 10 has the basic functions of an offline programming/simulating device: a function for determining and storing a work cell using a three-dimensional data and a layout data of the robot 1, the work tool 2, a workpiece, a jig for the workpiece and an object (not shown) around the robot; a function for making a robot program for operating the robot and the work tool by providing teaching data to the work cell; a function for simulating, in offline mode, the robot program or a external program transferred to the programming device; a function for judging the possibility of interference during operating the simulated program, by using the three-dimensional data and the layout data. As these functions themselves are known, a detailed description of each of the functions is omitted.

Using the above configuration and functions, a process, for returning the robot 1 to a waiting position when the robot 1 during operation is stopped by an error of the robot or an accident of another peripheral device, will be described below. In this point, it is assumed that a work cell corresponding to a system including the robot 1 is defined in the programming device 10 and the three-dimensional models and the layout data of the robot 1, the work tool 2, the workpiece, the jig for the workpiece and the peripheral device are prepared.

[Preparation 1]

As one preparation, one or more robot programs capable of being executed by the system including the robot 1 are prepared in the programming device 10 and the necessary attribute data are added to each teaching position included in the program. The attribute data in this case are available data for forming a proper returning path when programming a returning program. A concrete example of the attribute data is described below.

The robot program prepared in the programming device 10 may be made by using a programming function of the programming device 10. However, the robot program may be made by another offline programming device. Alternatively, the program used in the robot control device 3 as the teaching program may be transferred to the programming device 10 as the robot program.

When the robot program is prepared in the programming device, the above attribute data is usually not yet added to the teaching positions. Therefore, it is necessary to check characteristics of the teaching positions of the program, add necessary attribute data available for determining the returning path of the robot and store the attribute data. In the embodiment, three parameters are employed as one example of the attribute data, as described below. These parameters are represented by a 3-digit binary code "f g h" (f, g, h=0 or 1).

A character "f" is a parameter representing the propriety of the teaching position as the teaching point in the returning program. If f=0, the teaching position cannot be used as the teaching point in the returning program, otherwise (i.e., f=1), the teaching position can be used.

For example, "f=0" is added to a teaching position when the position is necessary for executing a basic operation (in this case the spot welding or the handling of the workpiece) but the returning path including the position is obviously a wasteful detour. Therefore, "f=1" is added to a teaching position when it is not inconvenient to use the position as the teaching point in the returning program.

Next, a character "g" is a parameter representing the propriety of the teaching position as the waiting position in the return program. "g=1" is added to a teaching position which is preferable as the waiting position (or the return position) of the returning program. "g=0" is added to other teaching positions.

At this point, the number of teaching position having "g=1" is not limited to one. Generally, "g=1" may be added to the position where interference between the robot and the peripheral devices does not occur and the large local stress is not applied to the robot. The exemplary waiting positions having "g=1" are a first and a last positions of the teaching path of the robot program. When a plurality of the waiting positions have "g=1", one of them must be selected at least when the returning program is executed (or when the robot is returned to the waiting position), as described below.

However, it is possible to determine a position, as the waiting position in the returning program, other than the teaching positions including the first and the last positions in the robot program. Therefore, when all of the teaching positions in the robot program has "g=0", a preferable position other than the teaching positions may be determined as the waiting position in the returning program.

Finally, a character "h" is a parameter indicating whether the work tool contacts the object or not. In other words, "h=1" is added to the teaching position where the work tool 2 is programmed to come into contact with the object (or the workpiece). "h=0" is added to other teaching point. In the spot welding, for example, "h=1" is added to the teaching position where the spot welding is carried out (or the spot gun is opened). In the handling operation, on the other hand, "h=1" is added to each of the teaching positions from a position where the object is gripped to a position where the object is released.

FIG. 2 shows an example of the attribute data (the 3-digit binary code) stored in the memory of the programming device 10 when the robot program for the spot welding includes thirteen teaching positions P1-P13. Also, FIG. 3 shows an example of the attribute data (the 3-digit binary code), similar to FIG. 2, when the robot program for the handling using a robot hand includes thirteen teaching positions Q1-Q13. In these cases, positions P1 and P13 may be the same, and/or positions Q1 and Q13 may be the same.

The operator may read out the data of the teaching positions for indicating them on the display 12 and input a suitable code by using the keyboard 11, in order to add the above attribute data to the teaching positions.

[Preparation 2]

Next, an initial setting of the actual machine of the robot 1 (the robot control device 3) is carried out. The robot program prepared by the offline programming in the above [Preparation 1] is downloaded to the robot control device 3. In this point, it is unnecessary to transfer the attribute data of the teaching positions to the control device 3. Further, when a robot program previously taught to the control device 3 is transferred to the programming device 10 and the attribute data is added to the teaching positions in [Preparation 1], it is unnecessary to download the robot program again. (If the teaching program should be corrected, a corrected robot program may be downloaded.)

In the robot program thus prepared for the control device 3, the teaching position may be corrected at need. For example, when the robot program is made by the programming device 10 offline, there often exist a difference of position between the predetermined layout data and the actual layout data of the operation system. Therefore, in order to correct the difference, the teaching position of the downloaded program is corrected.

After the teaching position is suitably corrected, the robot program is executed to activate the actual system. During operation, a cycle time of the program and a history of the operation are recorded. If the system does not normally operate, the robot program is corrected such that the system normally operates. When the cycle time and the history in a normal operation of the system are recorded, the robot program, the cycle time and the history are uploaded to the programming device 10. In addition, when the robot is configured to operate a plurality of operations, a plurality of cycle times and histories are recorded and uploaded to the offline programming system.

The preparation, for safely returning the robot 1 stopped by an error or the like to the waiting position, is thus completed.

[Return of the Robot to the Waiting Position After the Stop of the Robot]

When the robot 1 is stopped due to an error of the robot itself or a trouble of the peripheral devices during executing the robot program, the operator directs, for example by operating the keyboard 11, the programming device 10 to return the robot to its waiting position. Then, the programming device 10 gets necessary data from the robot control device 3 to automatically make the returning program and transfers the returning program to the control device 3 after checking the safety of the program. After received the returning program, the robot control device 3 executes the returning program in order to safely and rapidly return the robot 1 to the waiting position.

Figure 4:
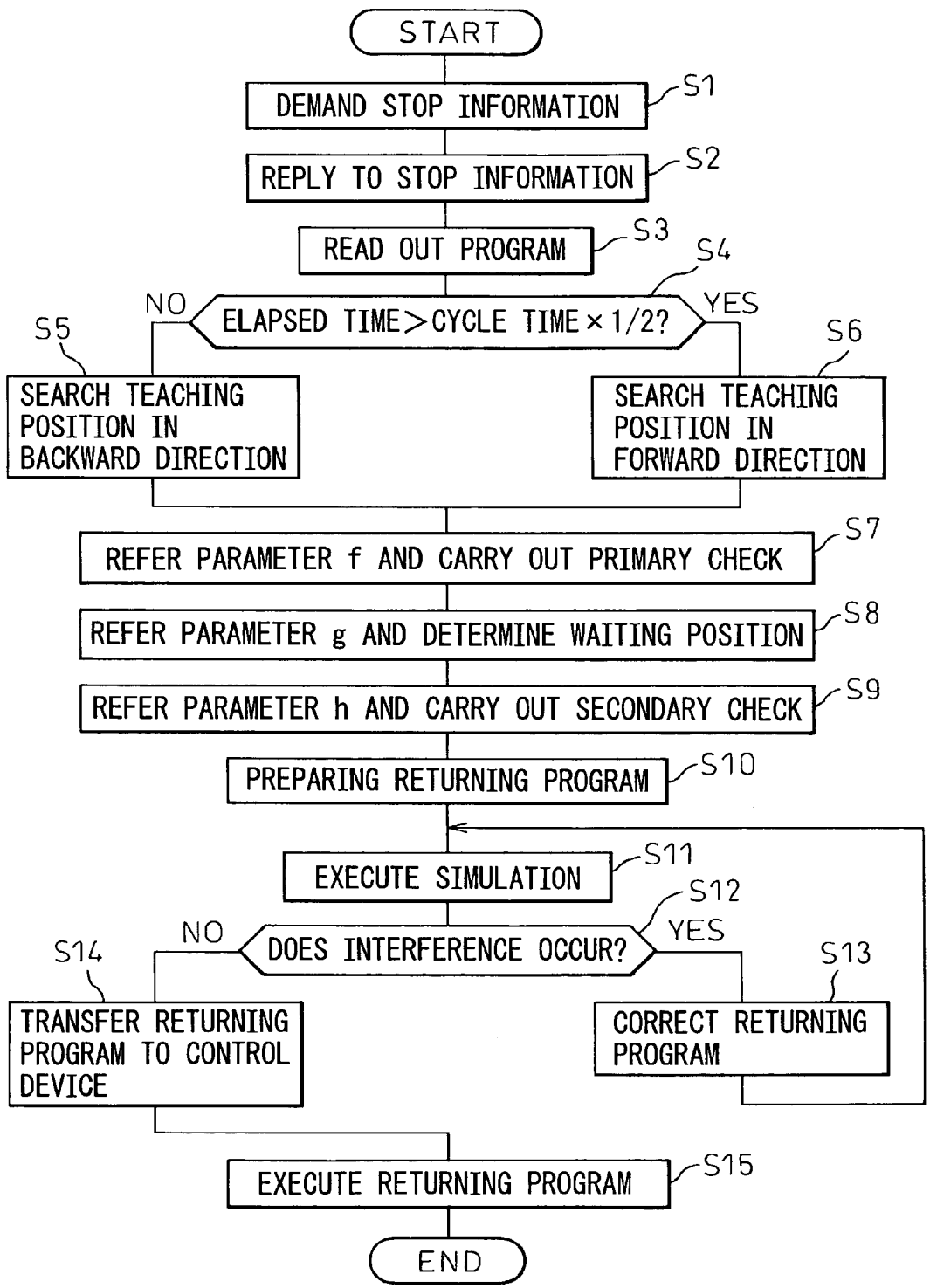
FIG. 4 is a flowchart showing steps carried out in a series of processes from stopping the robot to returning the robot to a waiting position in the embodiment.

FIG. 4 shows a flowchart indicating steps carried out in a series of processes. A main point of each step of the flowchart will be described below. In the description, the teaching positions P1-P13 added the attribute data shown in FIG. 2 are appropriately referred. Further, the teaching positions Q1-Q13 added the attribute data shown in FIG. 3 are referred using parentheses.

Step S1

The programming device 10 transfers a signal, for demanding information of the stop of the robot, to the robot control device 3.

Step S2

After receiving the demanding signal, the robot control device 3 sends information described below, as a reply to the signal, to the programming device 10.

(a) Stopped Program Discriminating Data

In other words, this data is for discriminating the robot program when the robot is stopped. One example of the data is a code name of the robot program.

(b) Stop Position Data

In other words, this data is for discriminating teaching positions before and after a point where the robot is stopped, in case that the point does not coincide with any of the teaching positions. Alternatively, the data is for discriminating the one teaching position where the robot is stopped.

(c) Elapsed Time Data

In other words, the data represents the elapsed time from the activation of the robot program to the stop of the robot by an error or the like.

Step S3

The programming device 10 reads out a corresponding robot program from the memory, based on the received "stopped program discriminating data", as well as the attribute data of the teaching positions and the data of the cycle time and the history.

Step S4

When the elapsed time is equal to or less than a half of the cycle time, the process progresses to step S5, otherwise, to step S6.

Step S5

The selecting part 10d described above sequentially searches the teaching positions before the point where the robot is stopped, from the stopped block of the robot program, in a backward direction of an executing direction of the robot program and lists all of the searched teaching positions as "teaching points capable of being used in the returning program". For an example of the teaching positions, as shown in FIG. 2 (or FIG. 3), when the point where the robot is stopped is between points P6 and P7 (or Q6 and Q7), points P6, P5, P4, P3, P2 and P1 (Q6, Q5, Q4, Q3, Q2 and Q1) are listed.

Step S6

The selecting part 10d described above also sequentially searches the teaching positions after the point where the robot is stopped, from the stopped block of the robot program, in the executing direction or a forward direction of the robot program and, lists all of the searched teaching positions as "teaching points capable of being used in the returning program". For an example of the teaching positions, as shown in FIG. 2 (or FIG. 3), when the point where the robot is stopped is between points P6 and P7 (or Q6 and Q7), points P7, P8, P9, P10, P11, P12 and P13 (Q7, Q8, Q9, Q10, Q11, Q12 and Q13) are listed.

Step S7

In relation to each of the teaching points listed up in step S5 or S6, "a primary check" is carried out. In the primary check, the teaching point, having the parameter "f" of the attribute data of the point equal to "0", is excluded. In the above example, points P5 and P3 (or Q6) are excluded and points P6, P4, P2 and P1 (or Q5-Q1) are remained. Further, points P7, P9 and P11 (or no point) are excluded and points P8, P10, P12 and P13 (or Q7-Q13) are remained.

Step S8

One of the remained teaching points having, the parameter "g" of the attribute data of the point equal to "1", is determined as a waiting position (a return position). In the case of FIG. 2 (or FIG. 3), point P1 or P13 (or Q1 or Q13) is determined as the waiting position. In this regard, when two or more teaching points have the parameter "g" equal to "1", only one of them has to be determined as the waiting position by a suitable predetermined rule.

Step S9

In relation to each of the remained teaching points except for the teaching point determined as the waiting position in step S8, "a secondary check" is carried out. The secondary check is based on the parameter "h" of the attribute data. As described above, the parameter "h" relates to the contact between the robot and the workpiece. As the propriety of the teaching position in the robot program as the teaching point in the returning program may be judged by the parameter "h", it is preferable that each teaching point is excluded, depending on whether the parameter "h" of the teaching point is equal to "0" or "1".

As shown in the example of FIG. 2, when the robot is the spot welding robot, the teaching point having the parameter "h" equal to "1" corresponds to a point where the spot welding is carried out. Therefore, the teaching point having the "h" equal to "1" is excluded in the secondary check. In the example of FIG. 2, points P3, P5, P7, P9 and P11 where the spot welding is carried out have already been excluded in step S7, because these points have the parameter "f" equal to "0". Therefore, no point is excluded in the secondary check.

Figure 6:
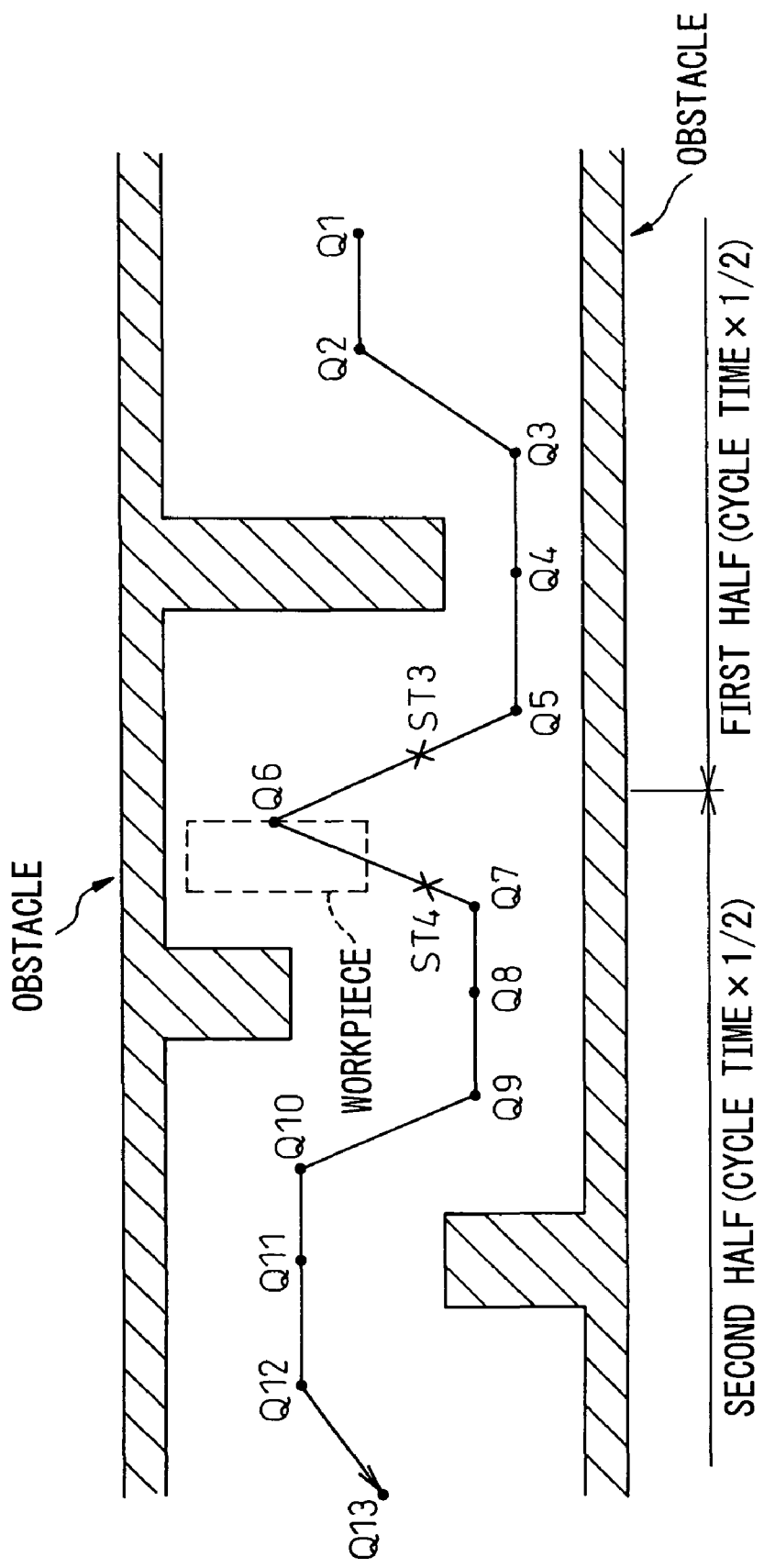
FIG. 6 shows, similarly to FIG. 5, a teaching path and two returning paths of the robot after it is stopped, in case of a handling robot.

On the other hand, as shown in the example of FIG. 3, when the robot is the handling robot, the secondary check depends on whether the robot grips the workpiece or not. This is because, as shown in FIG. 6, the robot gripping the workpiece occasionally cannot pass through a narrow path from point Q3 to point Q5, as the path is designed such that only the robot gripping nothing can pass the path. Concretely, a detecting device or a sensor 5 is provided which is capable of detecting in real-time whether the robot 1 actually grips the workpiece. When the sensor 5 detects that the robot grips the workpiece (on or after point Q6 in this embodiment), the teaching point having the parameter "h" equal to "1" should be remained and the teaching point having the parameter "h" equal to "0" has to be excluded. On the other hand, the sensor 5 detects that the robot does not grip the workpiece (before point Q6), both teaching points having the parameter "h" equal to "1" and "0" may be selected as the teaching points of the returning program. Therefore, even on or after point Q6, if the robot does not grip the workpiece by some reasons, the teaching point having the parameter "h" equal to "0" may be selected.

Eventually, the remained teaching points in each of the examples of FIG. 2 (the robot is assumed to stop between points P6 and P7) and FIG. 3 (the robot is assumed to stop between points Q6 and Q7) are selected as below:

In case that the elapsed time is smaller than a half of the cycle time in the example of FIG. 2

P6, P4, P2 and P1

In case that the elapsed time is equal to or larger than a half of the cycle time in the example of FIG. 2

P8, P10, P12 and P13

In case that the elapsed time is smaller than a half of the cycle time in the example of FIG. 3

Q5-Q1

In case that the elapsed time is equal to or larger than a half of the cycle time in the example of FIG. 3

Q7-Q13

In this way, among the teaching positions included in the robot program the teaching points used in the returning program stopped during operation, the teaching points used in the returning program may be determined.

Step S10

The returning program including a returning path for the robot is made by using the determined teaching points. The returning path of each of the above cases is determined as below:

In case that the elapsed time is smaller than a half of the cycle time in the example of FIG. 2

P6→P4→P2→P1

In case that the elapsed time is equal to or larger than a half of the cycle time in the example of FIG. 2

P8→P10→P12→P13

In case that the elapsed time is smaller than a half of the cycle time in the example of FIG. 3

Q5→Q4→Q3→Q2→Q1

In case that the elapsed time is equal to or larger than a half of the cycle time in the example of FIG. 3

Q7→Q8→Q9→Q10→Q11→Q12→Q13

As for a form (a straight line or an arc, etc.) of the movement of the robot, "a straight line" is preferable, for example. Alternatively, another rule for selecting the form may be previously determined, based on the history of the execution of the stopped robot program. Further, it is preferable that constants regarding a velocity and an acceleration of the movement of the robot are automatically set to relatively low values, taking safety into consideration.

Step S11

A simulation of the prepared returning program is executed using an offline simulation function of the programming device 10.

Step S12

The interference judging part of the programming device judges whether interference between the robot and the peripheral devices around the robot occurs. When it is judged that the interference occurs, the process progresses to step S13, otherwise, to step S14.

Step S13

The returning program is corrected by the operator.

The operator searches a cause of the interference by, for example, indicating the path of the returning program on the display 12, in order to correct the returning program. For example, to avoid interference, the operator may insert a new teaching point other than the teaching points included in the robot program or he may move the waiting position to another place. After the operator corrects the program, the process is returned to step S11.

In addition, in case that the system includes a plurality of robots and the robot 1 may interferes with one of the other robots, the process is once interrupted and a process from step S1 regarding the other robot is carried out so as to return, first, the other robot to a waiting position thereof. After that, the process of the robot 1 is restarted from step S11.

Step S14

The returning program is transferred to the robot control device 3.

Step S15

The robot control device 3 executes the received returning program to move the robot 1 to the waiting position, then, terminates the process.

The above process is merely one example, therefore, the process may be modified as below:

(a) The waiting position may be previously set, without relation to the teaching positions included in the teaching program. For example, in the example of FIG. 2, another point P0 may be located near point P1 (or P13). In this case, when the elapsed time is smaller than a half of the cycle time, the returning path may be set to P6→P4→P2→P1→P0. Otherwise (when the elapsed time is equal to or larger than a half of the cycle time), the returning path may be set to P8→P10→P12→P13→P0.

(b) In the above example, the direction of searching the teaching positions in the robot program, for determining selecting the returning path, may change depending on the comparison of the elapsed time with a half of the cycle time. However, the direction of searching may be fixed to one direction (for example, the backward direction of the executing direction of the program). Alternatively, two programs may be made, in step S10, by searching for the teaching positions in the executing direction and the backward direction thereof, respectively. Then, the programs are simulated so as to check the occurrence of interference. In this case, when the interference may occur in one of the programs, the other program is employed. Otherwise, when it is judged that the interference does not occur in any of the programs, the program having a shorter cycle time should be selected.

(c) During the robot control device 3 is executing the returning program in step S15, an operation for security may be carried out before the robot is moved, if required. For example, when the robot is the spot welding robot, it should be checked that the welding gun is opened. If the gun is closed, the gun is opened before the robot is moved. A command for opening the gun may be inserted into the beginning of the returning program.

Figure 5:
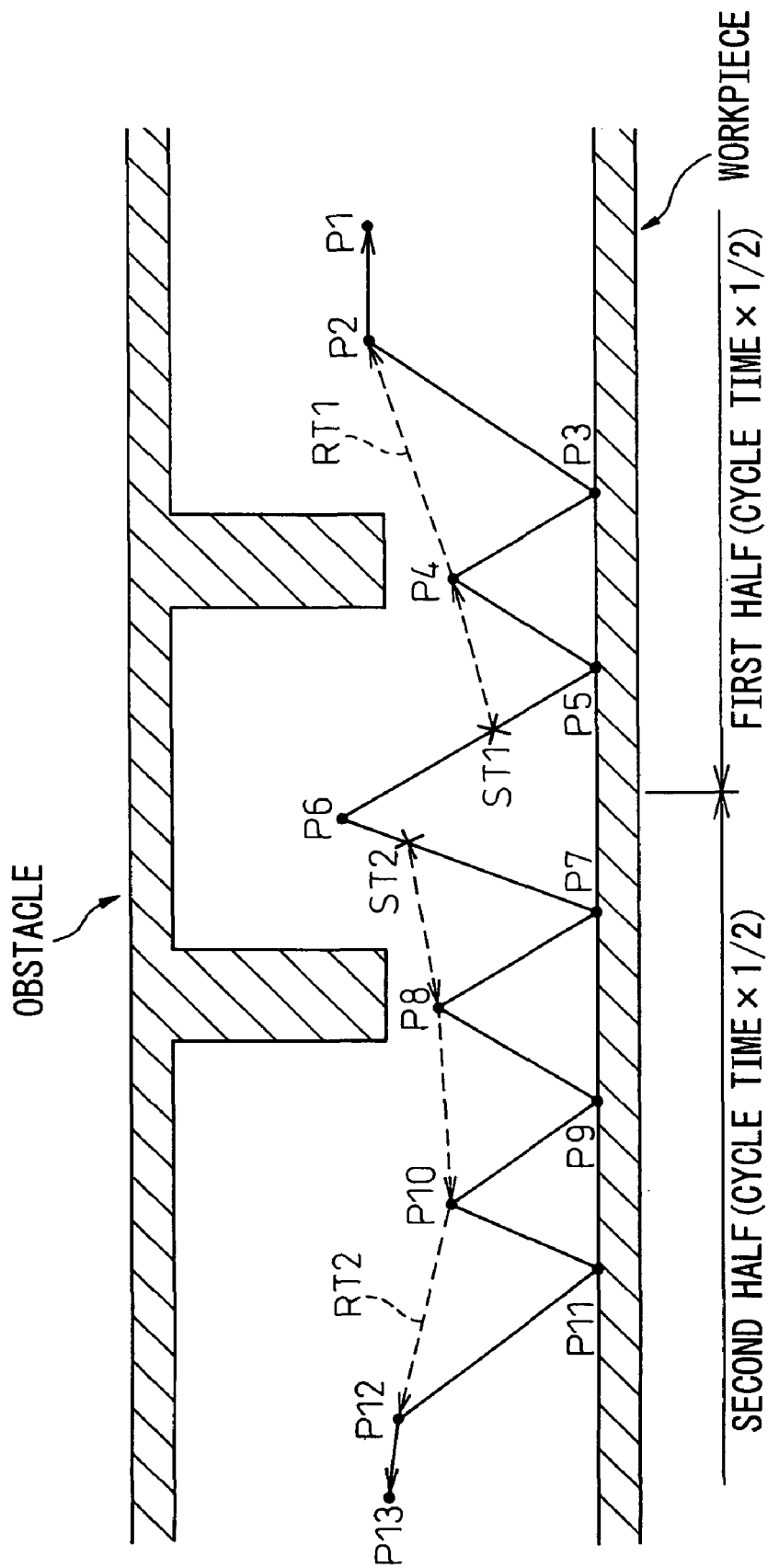
FIG. 5 shows a teaching path and two returning path of the robot after it is stopped in case of a spot welding robot.

FIG. 5 shows examples of two returning paths of the returning program, as well as the robot programming path (P1→P2→P3→ . . . →P12→P13), in relation to the example of FIG. 2 (or the spot welding robot). In FIG. 5, a returning path RT1 (ST1→P4→P2→P1) is an example selected when the robot is stopped at a position ST1 or in a first half of the cycle time. On the other hand, a returning path RT2 (ST2→P8→P10→P12→P13) is an example selected when the robot is stopped at a position ST2 or in a second half of the cycle time.

As the position "between points P6 and P7" described above corresponds to the point ST2 in FIG. 5, an output in step S4 is "Yes". Therefore, the process is progressed to step S7 via step S6, whereby the returning path RT2 is selected and the returning program is executed. It would be recognized that the returning path thus selected allows the robot to safely and rapidly return to the waiting position.

On the other hand, FIG. 6 shows examples of two returning paths of the returning program, as well as the robot programming path (Q1→Q2→Q3→ . . . →Q12→Q13), in relation to the example of FIG. 3 (or the handling robot). In FIG. 6, a returning path (Q5→Q4→Q3→Q2→Q1) is selected when the robot is stopped at a position ST3 or in a first half of the cycle time. On the other hand, another returning path (Q7→Q8→Q9→Q10→Q11→Q12→Q13) is selected when the robot is stopped at a position ST4 or in a second half of the cycle time.

According to the invention, the robot may be safely and rapidly returned, to its waiting position, when the operation of a whole system, including the robot stopped by an error of the like during the operation, should be restarted from the first. Therefore, the deterioration of the productive efficiency caused by the error may be greatly reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A programming device, connected to a robot operated based on a teaching program, for making a returning program for returning the robot from a stop position where the robot during operation is stopped by an emergency stop to a waiting position, the programming device comprising:

an attribute data providing part for providing attribute data to each teaching position included in the teaching program, the attribute data representing whether each teaching position may be used for a teaching point of the returning program or not;

a storing part for storing at least one teaching program capable of being executed by the robot and layout-information of the robot and an object existing around the robot;

a receiving part for receiving data of the stop position, information for discriminating a teaching program stopped by the emergency stop and information of a block of the program executed when the program is stopped by the emergency stop;

a selecting part reading a teaching program from the storing part corresponding to the information for discriminating, sequentially searching the teaching positions, from the block of the teaching program, in an executing direction of the program or a backward direction thereof, and selecting the teaching points used for the returning program based on the attribute data of the teaching positions;

a programming part for making the returning program based on the stop position and the teaching points selected by the selecting part;

an interference judging part simulating the operation of the robot based on the returning program prepared by the programming part and the layout-information so as to judge whether interference occurs between the robot and the object around the robot or not; and a transferring part for transferring the returning program to the robot when the interference judging part judges that interference between the robot and the object around the robot does not occur, wherein the storing part stores a cycle time of the teaching program, and the selecting part selects the teaching positions by sequentially searching the teaching positions in a backward direction of the executing direction of the program when an elapsed time from the start of the program to the emergency stop is shorter than a half of the cycle time or selects the teaching positions by sequentially searching the teaching positions in the executing direction of the program when the elapsed time is equal to or longer than the half of the cycle time.

2. The programming device as set forth in claim 1, wherein the waiting position is one of a first teaching position and a last teaching position of the teaching program stopped by the emergency stop.

3. The programming device as set forth in claim 1, wherein the waiting position is determined as one of the teaching positions included in the teaching program stopped by the emergency stop, based on the attribute data provided to each teaching position.

4. The programming device as set forth in claim 1, wherein the waiting position is determined as another position except for the teaching positions included in the teaching program stopped by the emergency stop.

5. The programming device as set forth in claim 1, wherein the selecting part selects the teaching positions by sequentially searching the teaching positions in a backward direction of the executing direction of the program when the block of the program received by the receiving part at the time of the emergency stop is before an intermediate block where a half of the cycle time elapses or selects the teaching positions by sequentially searching the teaching positions in the executing direction of the program when the block of the program received by the receiving part is after the intermediate block.

6. The programming device as set forth in claim 1, wherein the programming part compares a program, made by searching the teaching positions in the executing direction of the teaching program, to a program, made by searching the teaching positions in the backward direction of the executing direction of the teaching program, and selects one of the programs, as the returning program, which has shorter time for returning the robot to the waiting position.

7. The programming device as set forth in claim 1, wherein the robot is a welding robot provided with a welding gun, the attribute data include first discrimination data representing whether each teaching position is a welding position where welding is carried out or not, and the selecting part selects the teaching positions other than the welding position, as the teaching points of the returning program.

8. The programming device as set forth in claim 7, wherein the programming part makes the returning program including a command for opening the welding gun before returning the robot to the waiting position, when the welding gun is closed at the stop position where the robot is stopped.

9. The programming device as set forth in claim 1, wherein the robot is a handling robot provided with a hand, the attribute data include second discrimination data representing whether the robot grips an object at each teaching position or not, the robot has a detecting device for detecting whether the robot in fact grips the object in real-time, and the selecting part selects the teaching position, where the robot grips the object based on the second discrimination data, as the teaching points of the returning program, when the robot, in fact, grips the object at the stop position where the robot is stopped.

* * * * *